No. 717,220. Patented Dec. 30, 1902.
JOHN KÖLLING, HENRY KOELLING & HERMANN KOELLING.
CORN HUSKING AND STALK CUTTING MACHINE.
(Application filed Apr. 9, 1900.)
(No Model.) 3 Sheets—Sheet 1.
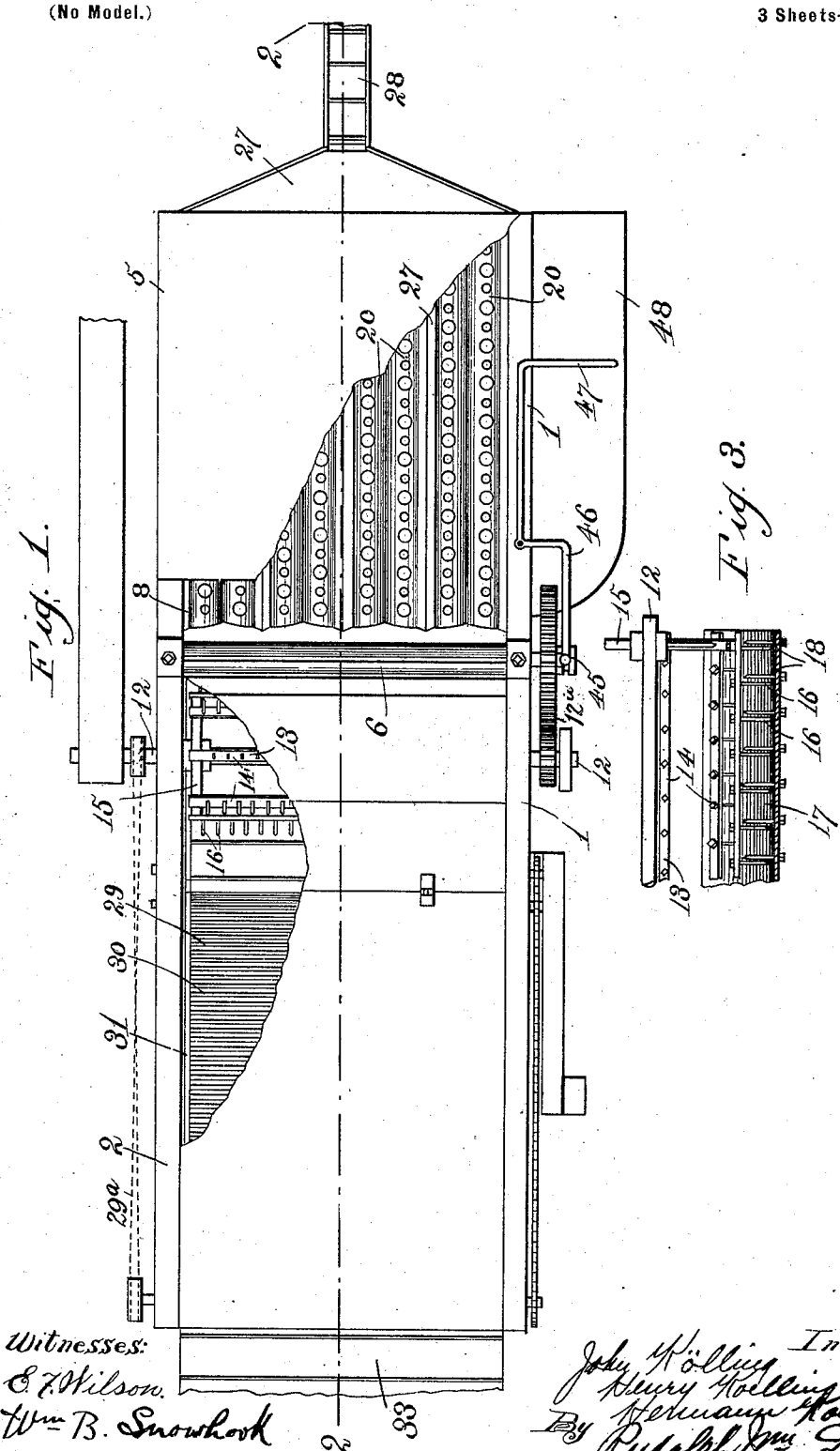

No. 717,220. Patented Dec. 30, 1902.
JOHN KÖLLING, HENRY KOELLING & HERMANN KOELLING.
CORN HUSKING AND STALK CUTTING MACHINE.
(Application filed Apr. 9, 1900.)
(No Model.) 3 Sheets—Sheet 2.
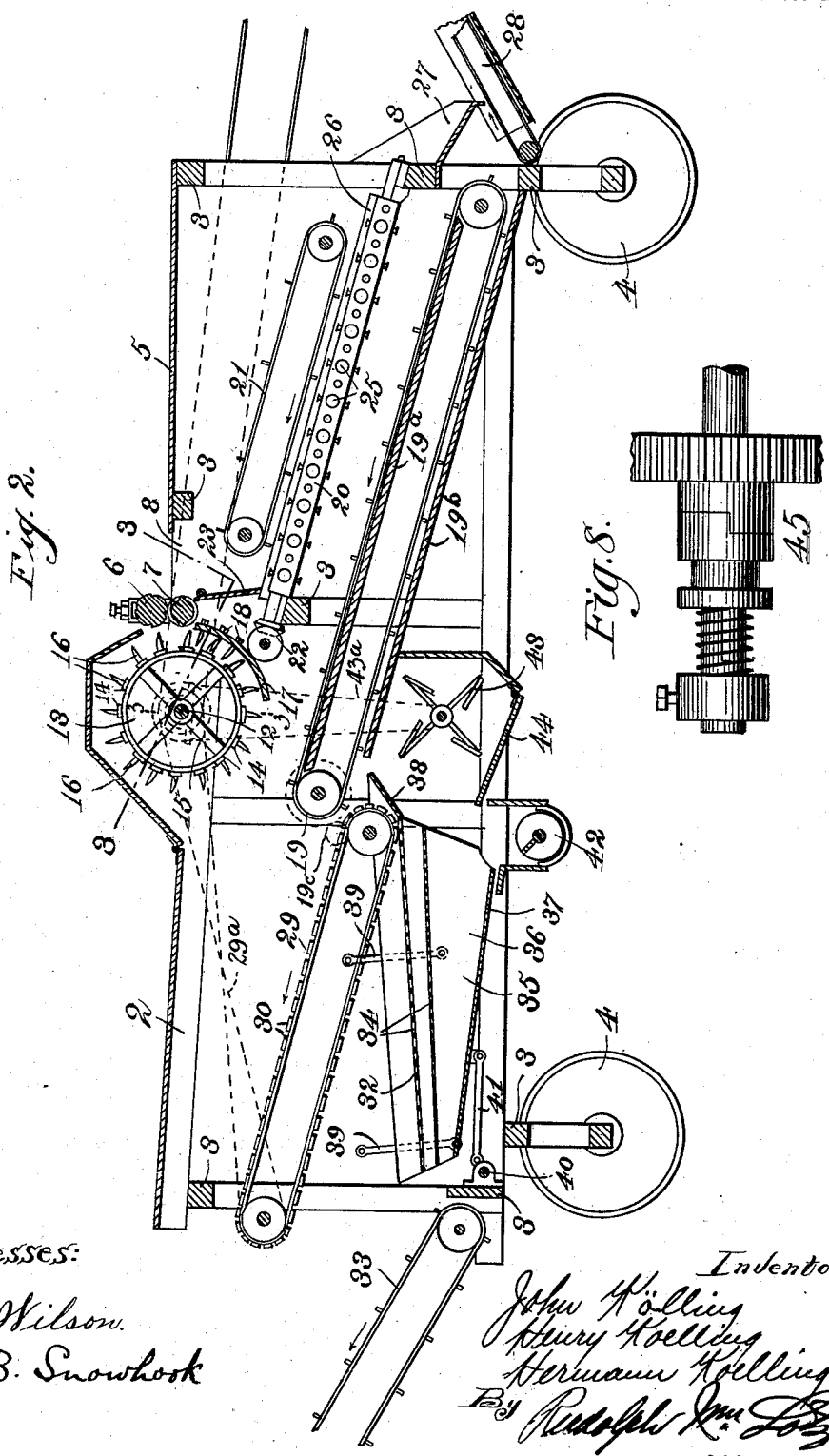
Witnesses:
E. F. Wilson.
Wm B. Snowhook.
Inventors
John Kölling
Henry Koelling
Hermann Koelling
By Rudolph Wm Lotz
Attorney.

No. 717,220. Patented Dec. 30, 1902.
JOHN KÖLLING, HENRY KOELLING & HERMANN KOELLING.
CORN HUSKING AND STALK CUTTING MACHINE.
(Application filed Apr. 9, 1900.)
(No Model.) 3 Sheets—Sheet 3.
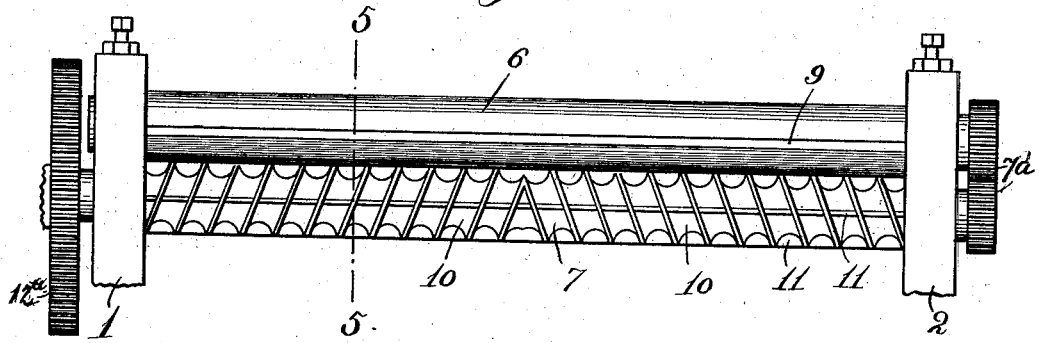
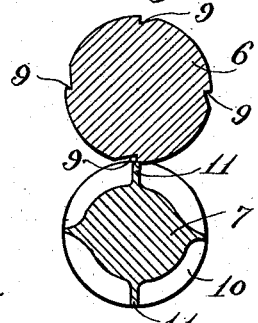
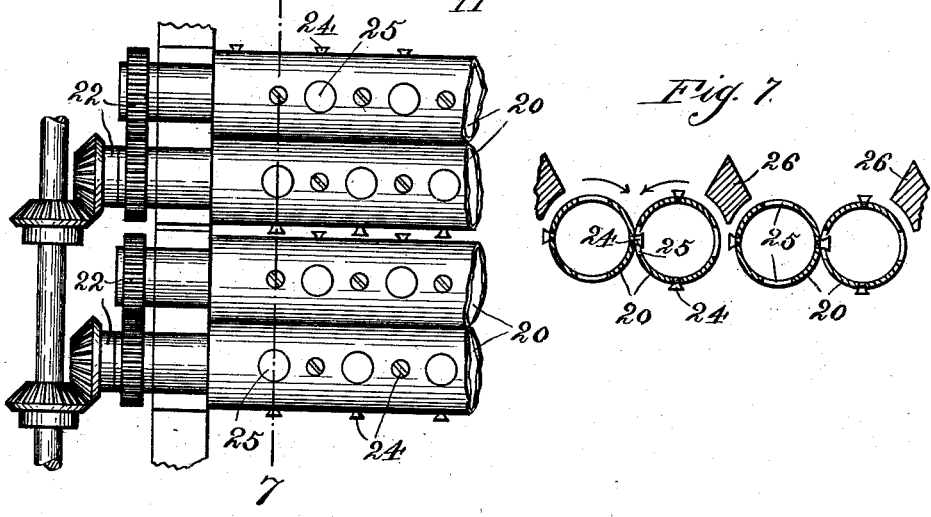
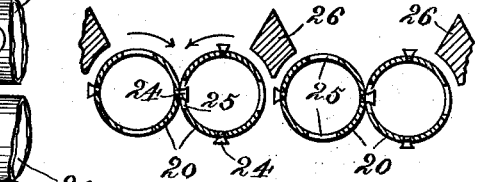
Witnesses:
E. F. Wilson
W. B. Snowhook
Inventors:
John Kölling
Henry Koelling
Hermann Koelling
By Rudolph ... Attorney.

UNITED STATES PATENT OFFICE.

JOHN KÖLLING, HENRY KOELLING, AND HERMANN KOELLING, OF ARLINGTON HEIGHTS, ILLINOIS.

CORN-HUSKING AND STALK-CUTTING MACHINE.

SPECIFICATION forming part of Letters Patent No. 717,220, dated December 30, 1902.

Application filed April 9, 1900. Serial No. 12,117. (No model.)

*To all whom it may concern:*

Be it known that we, JOHN KÖLLING, HENRY KOELLING, and HERMANN KOELLING, citizens of the United States, residing at Arlington Heights, in the county of Cook and State of Illinois, have invented certain new and useful Improvements in Corn-Husking and Stalk-Cutting Machines; and we do hereby declare the following to be a full, clear, and exact description of the invention, such as will enable others skilled in the art to which it appertains to make and use the same.

Our invention relates to a novel construction in a corn-husking and stalk-cutting machine, the object being to provide a machine of this kind which while it snaps the ears from the stalks and removes the husks from the ears will shred and break the stalks suitable for feed and will also remove from the shredded stalks and husks any loose kernels which might be in same, it having been found that the percentage of loose kernels is sufficient through their fermentation to sour the whole mass of shredded material, thus making it unfit for feed.

Our invention consists in the features of construction and combinations of parts hereinafter fully described and claimed.

In the accompanying drawings, illustrating our invention, Figure 1 is a top plan view of a machine constructed in accordance with our invention. Fig. 2 is a vertical longitudinal section of same on the line 2 2 of Fig. 1. Fig. 3 is a detail section on line 3 3 of Fig. 2. Fig. 4 is a detail elevation of the snapping-rolls. Fig. 5 is a vertical section on line 5 5, Fig. 4. Fig. 6 is a detail plan view of the husking-rolls. Fig. 7 is a vertical section on line 7 7, Fig. 6. Fig. 8 is a detail elevation of the spring-clutch mechanism.

Our device consists of two parallel side frames 1 and 2, connected together by means of a plurality of cross-pieces 3, the sides being inclosed with any suitable material and the whole forming a rectangular box-like structure open at its ends and suitably mounted on wheels 4 for ease of transportation. A feed board or table 5 is provided at the top of the forward end of the machine, on which the bundles of stalks are placed preparatory to being fed to the snapping-rolls 6 and 7. The latter are journaled in spring-actuated bearings in said side frames 1 and 2, said roll 6 being placed vertically above said roll 7 and being normally held in contact therewith, the line of contact being on a level with the top of the feed-board 5, which terminates adjacent said snapping-rolls, leaving an open space 8 through which the ears of corn drop when snapped from the stalks. Said roll 6 is provided with a plurality of longitudinal angular grooves 9. The surface of said roll 7 is provided with right and left spiral grooves 10, which start at the middle of said roll and extend toward the ends thereof, the walls of said grooves 10 being connected with a plurality of narrow longitudinal ribs 11. The cornstalks are fed to the snapping-rolls midway between the ends of the latter, and as the stalks are drawn through between the same the spiral grooves 10 spread the stalks toward the ends of the rolls, thus leaving the middle portion of same free for feeding more stalks and making use of the whole length of the rolls for snapping off the ears, which on account of their bulk and solidity do not pass through between the rolls. As the stalks are drawn through between the snapping-rolls 6 and 7 the longitudinal grooves 9 and the ribs 11 tend to crush the stalks, so that they are easily broken into short pieces. Beyond said snapping-rolls and adjacent thereto and rigidly mounted on a shaft 12 is a shredding-cylinder 13, consisting of a plurality of longitudinal bars 14, rigidly fastened to a plurality of disks 15, mounted rigidly upon said shaft 12. The lower snapping-roll 7 is driven by the shaft 12 through gearing $12^a$, and the rolls 6 and 7 are geared together, as shown at $7^a$, Fig. 4. Projecting from said bars 14 and arranged in rings around said cylinder are a plurality of knives or cutters 16. Mounted below said snapping-rolls and concentric with said shredding-cylinder is a segmental plate 17, provided with a plurality of fixed projecting knives or cutters 18, similar to the knives 16 and alternating therewith, said knives 16 and 18 being adapted to shred or slit the stalks longitudinally, while the bars 14 tend to break the slitted stalks into short pieces suitable for feed, the inclined conveyer-belt 19 being adapted to receive said slitted stalks as they drop from said plate 17 and cylinder 13. As the ears are snapped from the stalks they drop through said opening 8 upon the upper end of a plurality of pairs of inclined husking-rolls 20, down the incline of which they slowly travel, being helped on their course by means of the conveyer 21, which is placed above and parallel to said husking-rolls. Said husking-rolls 20 are rigidly mounted on shafts journaled in bearings on two of the crosspieces 3, the forward ends being placed lower than the rearward ends. Suitable gearing 22 is provided at their upper ends, so that the rolls turn in the direction of the arrows on Fig. 7, said gearing being protected by the inclined hinged plate or apron 23, which plate tends to guide the ears to the said husking-rolls. Said husking-rolls 20 consist of pairs of tubes having a plurality of rows of rigidly-projecting pins 24 upon their cylindrical surfaces, said pins 24 being larger at their outer than at their inner ends. Alternating with said pins 24 are recesses or openings 25 through the walls of said tubes, into which said pins 24 of the other tube project as the rolls revolve. Guard-bars 26 are placed over alternate spaces to prevent undue agitation of the ears and at the same time to keep the ears moving down the incline in an endwise direction. As the ears move down the incline of said husking-rolls 20 the pins 24 catch the projecting portions of husks and pull them through between the said rolls and drop them upon the said conveyer 19, the husked ears being dropped from the lower end of the rolls 20 through the inclined chute 27 upon the ear-conveyer 28, by which they are delivered at any desired point. In practice it is found that the husking-rolls 20 loosen more or less kernels from the ears, which loose kernels are passed through said husking-rolls to the conveyer 19 along with the husks. Said conveyer 19 is situated below the said husking-rolls 20 and shredding-cylinder 13 and is adapted to receive the loosened husks and kernels and the shredded stalks and drop them upon the lower end of a conveyer 29. A platform 19ᵃ is carried by said frames 1 and 2 within said conveyer-belt 19, which acts as a support to the latter. Beneath said belt 19 is a floor 19ᵇ, which prevents any corn or husks from falling to the ground, said conveyer 29 being built up of wooden bars or slats 30, fastened to sprocket-chains 31, said bars 30 being separated sufficiently to allow the kernels of corn contained in the mass to fall through said conveyer 29 upon the vibratory screen 32. In order that the mass of material will not be too thick to allow the kernels to work through, the conveyer 29 is run at a higher speed than the conveyer 19, thus spreading the material in a thin layer on said conveyer 29. The conveyer 29 is driven by a crossed-belt connection 29ᵃ with the shaft 12, and between the conveyers 29 and 19 is reducing-gearing 19ᶜ. The mass of feed freed from all corn is dropped from said conveyer 29 upon a carrier 33, adapted to convey said feed from the machine and deliver it at any desired point. The said vibratory screen 32 consists of a plurality of slightly rearwardly inclined foraminated plates 34, held in a suitable frame 35, said frame having side walls 36, a downwardly-inclined bottom 37, the forward end being partially closed by the inclined wall 38. Said frame 35 is hung to the side walls of the machine by means of the links 39 and is vibrated by means of the crank-shaft 40 through the pitman 41, pivoted to the bottom 37 of said frame 35. The inclined end wall 38 helps to guide the kernels and chaff to the plates 34. As the kernels and chaff fall upon the said plates 34 they are violently agitated, and the kernels passing through said plates 34 are carried by said inclined bottom 37 to the spiral conveyer 42, which is situated below the forward end of said screen 32 and adapted to convey the corn delivered to it to any suitable receptacle. As the corn passes through said screen 32 the chaff is removed by a continuous blast of air produced by the rotating fan 43, situated below the rearward end of conveyer 19, the volume of air being suitably regulated by means of the adjustable door or plate 44, said chaff being delivered upon said carrier 33, together with the shredded stalks. The fan 43 is rotated through belt connection 43ᵃ with the shaft 12.

A spring-clutch 45 is provided on the shaft of snapping-roll 7, which normally holds same geared to the shaft of the shredding-cylinder 13. Said clutch is opened by means of a lever 46, pivoted to the side frame 1 and extending forward adjacent the forward end of the machine, where it is bent outwardly at right angles to form a guard 47. A platform 48 is provided, secured to said side frame 1, upon which the operator stands just forward of the guard 47. Should it be desirable when operating the machine to stop the snapping-rolls without stopping the power, the clutch 45 is opened by means of the lever 46. Then by reversing the power and closing said clutch 45 any foreign substance may be easily withdrawn.

We claim as our invention—

1. In a machine of the kind specified, a lower snapping-roll provided with spiral grooves extending from the center of said roll in opposite directions to the ends thereof to spread the stalks toward the ends of the roll and provided with a plurality of stalk-crushing ribs extending longitudinally of the roll and crossing each groove, and an upper snapping-roll mounted to be adjusted with reference to the lower roll and coacting with the latter to effect the spreading and crushing of the stalks.

2. In a machine of the kind specified, a lower snapping-roll provided with spiral grooves extending from the center of said roll in opposite directions to the ends thereof to spread the stalks toward the ends of the roll and provided with a plurality of stalk-crushing ribs extending longitudinally of the roll and crossing each groove, and an upper snapping-roll mounted to be adjusted with reference to the lower roll and provided with a plurality of longitudinally-disposed grooves corresponding to the ribs on the lower roll and coacting therewith to crush the stalks.

3. In a machine of the class specified, rolls adapted to snap the ears and crush the stalks, husking-rolls receiving the ears from the snapping-rolls, said rolls being connected with a source of power by a clutch whereby the snapping-rolls may be stopped independently of the other parts of the machine, an endless conveyer inclining upwardly beneath the husking-rolls to convey the husks and loose kernels rearwardly, a stalk-shredding cylinder adjacent to and receiving the stalks from the snapping and crushing rolls said cylinder being located to discharge directly onto the endless conveyer, an open-work conveyer having one end overlapped by the aforesaid conveyer and receiving therefrom the shredded stalks, husks and loose kernels, the open-work conveyer being operated to travel at a greater rate of speed than that of the first-named conveyer, a vibratory screen below the open-work conveyer receiving the chaff and loose kernels, a fan for removing the chaff and a conveyer for the recovered kernels.

In testimony whereof we affix our signatures in presence of two witnesses.

JOHN KÖLLING.
HENRY KOELLING.
HERMANN KOELLING.

Witnesses:
WILLIAM BATTERMANN,
OTTO VAHRANWALD.